United States Patent [19]
Ostdiek

[11] 3,782,206
[45] Jan. 1, 1974

[54] VORTEX LINEAR ACCELEROMETER

[75] Inventor: Arthur J. Ostdiek, Wheaton, Md.

[73] Assignee: The United States of America as represented by the Secretary of the Army, Washington, D.C.

[22] Filed: June 13, 1972

[21] Appl. No.: 262,404

[52] U.S. Cl. ................................................. 73/515
[51] Int. Cl. ........................................... G01p 15/02
[58] Field of Search ................... 73/515, 505, 194 C

[56] References Cited
UNITED STATES PATENTS

| | | | |
|---|---|---|---|
| 3,580,087 | 5/1971 | Sampson | 73/515 |
| 3,343,790 | 9/1967 | Bowles | 73/505 X |
| 2,215,447 | 9/1940 | Kollsman | 73/505 UX |
| 3,386,290 | 6/1968 | Egli | 73/505 |
| 3,436,969 | 4/1969 | Phillips | 73/505 |

Primary Examiner—James J. Gill
Attorney—Harry M. Saragovitz et al.

[57] ABSTRACT

A vortex linear accelerometer comprising an axisymmetric chamber, two bilaterally symmetric plena opening into said chamber, and a drain located in the center of said chamber with an airfoil pickoff located nearby and mounted within the chamber. The two plena supply fluids of different densities to the chamber. The chamber is in the shape of a flat cylinder and the plena supply fluid through the sidewall of said cylinder. When acceleration occurs along the bilateral axis of symmetry of the accelerometer a vortex is generated due to the unequal body forces acting upon the two different fluids. The intensity of the vortex is a function of the component of acceleration parallel to this axis of symmetry. The airfoil pickoff measures the streamline angle of the vortex within the chamber. The output of the pickoff is thus a function of this component. For applications involving angular motion about the cavity axis the angular component measured by the pickoff is cancelled by operating two accelerometers back to back.

6 Claims, 1 Drawing Figure

PATENTED JAN 1 1974　　　　　　　　　　　　　　　3,782,206
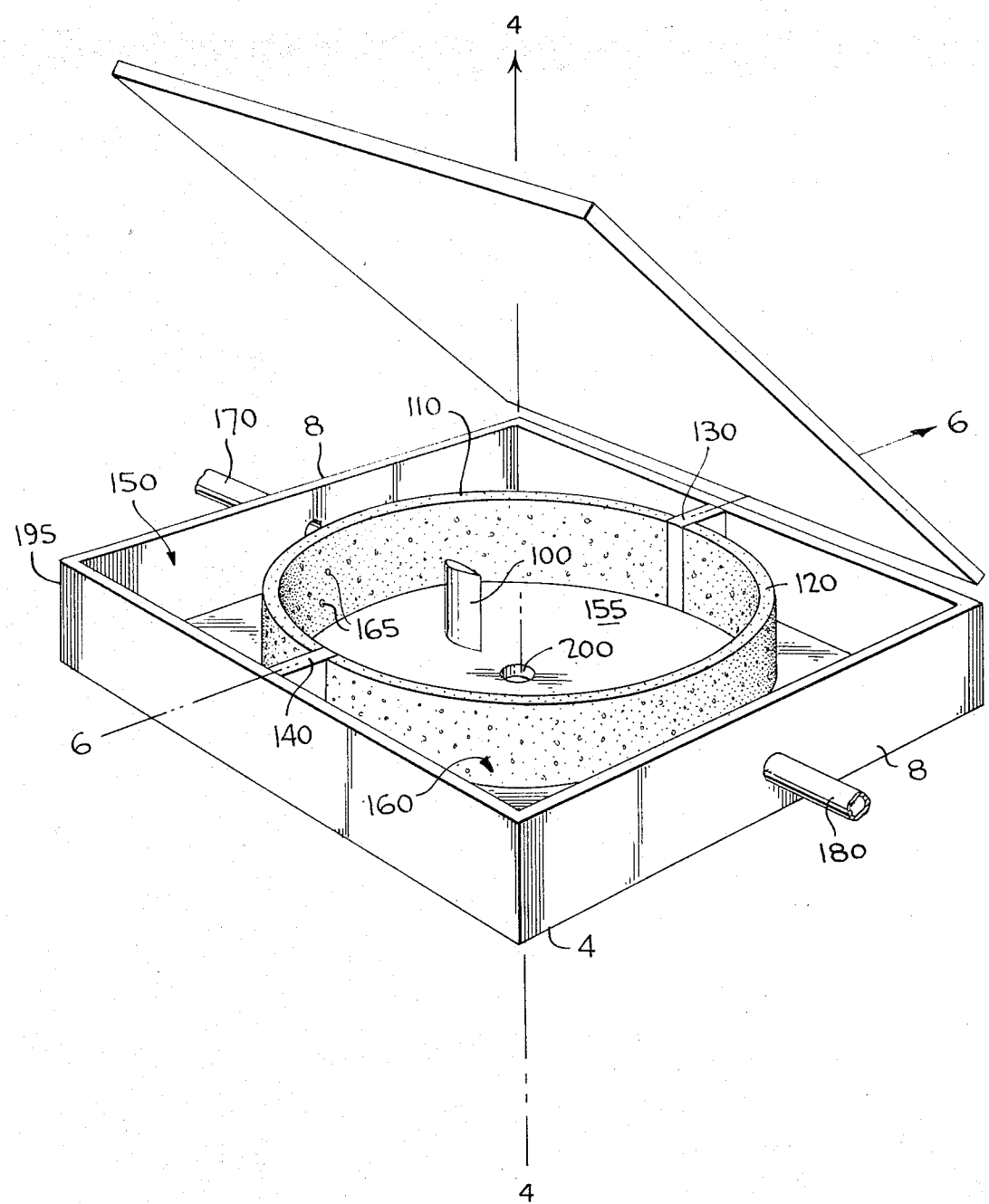

VORTEX LINEAR ACCELEROMETER

RIGHTS OF THE GOVERNMENT

The invention described herein may be manufactured, used, and licensed by or for the United States Government for governmental purposes without the payment to the inventor of any royalty thereon.

BACKGROUND OF THE INVENTION

This device is similar to the flueric device known as a vortex rate sensor invented almost a decade ago. In that device, one fluid was forced radially into a short cylindrical chamber through the porous outer wall (the coupler) and exhausted through a drain in one or both inwalls at the chamber axis. This sensor produced a signal that was a function of the rate at which it turned in inertial space about its longitudinal axis. In that design the signal was obtained in the drain from an airfoil pickoff whose output was a function of the streamline angle generated by the rotation.

Such a system as the foregoing is designed to provide a measure of the rate at which a body turns in inertial space about some given longitudinal axis, i.e., rotational motion. It is accordingly an object of this invention to provide a flueric accelerometer, for the measurement of linear acceleration, using no moving parts.

It is also an object of this invention to provide a vortex linear accelerometer that utilizes the vortex generated due to unequal forces exerted upon fluids of unequal densities supplied to a vortex rate sensor chamber. It is another object of this invention to provide a linear vortex accelerometer which cancels all components of rotational angular motion of the device about the principal axis of the cylindrical chamber.

Further objects and the entire scope of the invention will become more fully apparent in the following detailed description and in the appended claims.

SUMMARY OF THE INVENTION

The vortex linear accelerometer comprises essentially a shallow cylindrical chamber having a sidewall with small holes therein, a drain located in the center of the chamber, an airfoil pickoff located near the drain, and two plena bilaterally and symmetrically disposed at the sidewall of the cylindrical chamber for supplying fluids of two different densities. Fluid of one density issues from the plena located adjacent to the sidewall on one side of the bilateral axis and a fluid of a different density being supplied from a plena located adjacent to another portion of the sidewall of a chamber located on the other side of the bilateral axis. Each plena is connected to the central axisymmetric chamber by means of small holes. The airfoil pickoff mounted in the chamber measures the streamline angle in the chamber. When the accelerometer is accelerated a vortex is generated due to the unequal forces exerted upon each of the two fluids. The output of the pickoff in measuring the streamline angle in the chamber is a function of the component of acceleration along the bilateral axis of the chamber.

BRIEF DESCRIPTION OF THE DRAWINGS

The specific nature of the invention as well as other objects, aspects, uses, and advantages thereof will clearly appear from the following description and from the accompanying drawing, in which:

The FIGURE is a perspective view of a particular embodiment of the vortex linear accelerometer.

DESCRIPTION OF THE PREFERRED EMBODIMENT

In the FIGURE, a rectangular box 195 closed and having airtight edges is shown. Perpendicular to the axis 6—6 are inlet tubes 170 and 180 protruding from said box 195. The hollow box 195 has bilaterally and symmetrically disposed within it two semi-cylindrical members 110 and 120 about the 6—6 axis. Semi-cylindrical members 110 and 120 are porous materials and permit fluid to pass through them. Members 110 and 120 are separated by rectangular seals 140 and 130 along the 6—6 axis. Seal members 130 and 140 are located in the 6–4 plane. The semi-cylindrical members 110 and 120 juxtaposed against seal members 130 and 140 form a cylindrical chamber transversely disposed with respect to the 4—4 axis. Thus, axisymmetric chamber 155 is formed by walls 110 and 120 and the edges of seal members 130 and 140. Moreover plena 150 is formed by the seal members 150 and 130 inside wall of the box 195 and the outside surface of the member 110. Plena 160 is formed by surface of each of the seal members 140 and 130, the inside walls of the box 195 and the outside surface of the member 120. Concentric with the axisymmetric chamber 155 is located drain 200. Nearby drain 200 is located airfoil 100 which extends into the cylindrical space 155. Fluids of different densities issue through the holes 165 throughout members 110 and 120. Fluid of one density issues solely from member 110. Fluid of another density from plena 160 issues solely through member 120. When the device shown in FIG. 1 is accelerated along the 6—6 axis a vortex is formed in the cylindrical chamber 155 due to the unequal forces on the fluids in said chamber 155 due to the acceleration. The drain 200 located in the chamber 155 provides an outlet for the in-rushing fluids. The airfoil pickoff 100 mounted near the drain 200 measures the streamline angle of the vortex flow within the chamber.

Two such devices as shown in FIG. 1 mounted coaxially and back to back provide a pickoff output that is solely a function of the linear component of acceleration along the 6—6 axis even if the combination has an angular component of velocity about the axis of the chamber 155. In this situation the angular components measured by the pickoff cancel each other.

What is claimed is:

1. A vortex linear accelerometer comprising an axisymmetric chamber, at least two plena opening into said chamber, a first fluid supplied by one plenum, a second fluid supplied by another plenum, said first fluid having a greater density than said second fluid, an unobstructed drain located in said chamber, and a stationary airfoil pickoff means mounted on the floor of said chamber responsive to vortex flow in said chamber.

2. The vortex linear accelerometer of claim 1 wherein said chamber is a shallow cylindrical cavity having a bottom and a side wall with small holes.

3. The vortex linear accelerometer of claim 2 wherein said plena are symmetrically located with respect to an axis perpendicular to the principal axis of said chamber.

4. The vortex linear accelerometer of claim 3 wherein said airfoil mean is mounted near said drain.

5. The vortex linear accelerometer of claim 4 wherein said airfoil means is a sensor which provides pressure signals, said signals being proportional to the streamline angle within said chamber.

6. The vortex linear accelerometer of claim 5 wherein said signals provide a measure of the component of the linear acceleration of said chamber along the axis along which said plena are symmetrically located.

* * * * *